United States Patent [19]

Yamada et al.

[11] 4,212,523
[45] Jul. 15, 1980

[54] AUTO-FOCUS CAMERA HAVING RANGEFINDER SYSTEM

[75] Inventors: Seiji Yamada; Shinji Tominaga, both of Sakai; Yasuzi Kogure, Kawanishi; Toshinori Imura, Sakai, all of Japan

[73] Assignee: Minolta Camera Kabushiki Kaisha, Osaka, Japan

[21] Appl. No.: 959,776

[22] Filed: Nov. 13, 1978

[30] Foreign Application Priority Data

Nov. 18, 1977 [JP] Japan .................. 52-139195

[51] Int. Cl.$^2$ .............................................. G03B 3/10
[52] U.S. Cl. ........................................................ 354/25
[58] Field of Search ..................... 354/25; 352/14 D; 355/56

[56] References Cited

U.S. PATENT DOCUMENTS 4,065,778  12/1977  Harvey .......................... 354/25

Primary Examiner—Michael L. Gellner
Attorney, Agent, or Firm—Wenderoth, Lind & Ponack

[57] ABSTRACT

An auto-focus camera including an automatic rangefinder device for generating a distance signal indicative of the distance between the camera and a target object to be photographed, a timer circuit for generating an output signal a predetermined time after a power switch is closed, to place a lens drive mechanism in an operative condition for repositioning an objective lens assembly of the camera in search of the true focus setting, and a lens arresting circuit including electromagnetic units. Either of the electromagnetic units is operable to arrest the objective lens assembly at a corresponding focal position when energized by the distance signal. The automatic rangefinder device can measure the distance from the camera to the target object independent of the release of the lens drive mechanism.

14 Claims, 10 Drawing Figures

AUTO-FOCUS CAMERA HAVING RANGEFINDER SYSTEM

BACKGROUND OF THE INVENTION

The present invention generally relates to an auto-focus camera and, more particularly, to a photographic camera of a type having an automatic rangefinder system for automatically determining the distance from the camera to an object to be photographed and for automatically adjusting the focus of the camera lens in accordance with that determination.

Various types of automatic rangefinder systems designed for use in photographic cameras have heretofore been known and some of them are successfully commercially embodied. Some of the commercially embodied automatic rangefinder systems utilize the principle of triangulation for the distance measurement and generally comprise stationary and movable rangefinder optical systems, separate from the objective lens system of the photographic camera, the movable rangefinder optical system having an optical axis capable of moving angularly to sweep the field of view of the photographic camera while the objective lens system of the photographic camera is moved from, for example, a "near" position towards a hyperfocal position in search of the true focus setting. As a common feature of such commercially embodied automatic rangefinder systems, the physical energy required to achieve the motion of the optical axis of the movable rangefinder optical system and also the movement of the objective lens assembly originates from a mechanical spring element adapted to be charged to accumulate a biasing force in operative association with the movement of a film advancing or winding lever. Thus, the distance determination is always accompanied by the physical movement of the optical axis and the camera objective lens.

In these known automatic rangefinder systems used in photographic cameras, where a photographer attempting to take a photographic picture of an object at a certain time discontinues, interrupts or suspends depression of the release button after the camera objective lens system has been focused, but before the photograhic film is exposed, any subsequent attempt to take a picture with different focusing requires the mechanical spring element to be charged prior to the next depression of the release button.

SUMMARY OF THE INVENTION

Accordingly, an essential object of the present invention is to provide an improved auto-focus camera having an automatic rangefinder system wherein no motion of the optical axis is required for the distance determination and which is easy to handle.

Another important object of the present invention is to provide an improved auto-focus camera of the type referred to above, which is free from erroneous operation.

A further important object of the present invention is to provide an improved auto-focus camera of the type referred to above, which can easily achieve focus-lock photography. Note that the term "focus-lock photography" referred to above and hereinafter used means a photographic shooting method wherein, after the focal adjustment of the camera objective lens with an object to-be-photographed aligned with a central framing mark which is provided in a viewfinder arrangement for the purpose of aiming at a portion of the object on which the camera objective lens is to be focused, the camera is moved so as to encompass the desired background behind the object to-be-photographed as viewed in the viewfinder arrangement and, then, the actual taking a photographic picture of such an object is performed.

According to the present invention, the auto-focus camera comprises a power switch adapted to be closed in response to depression of a shutter release button, a rangefinder system adapted to be brought into operation when electric power is supplied thereto upon closure of the power switch for measuring the distance from the camera to a target object to be photographed and for generating a distance signal indicative of the measured distance from the camera to the target object, a delay circuit which is brought into operation upon closure of the power switch and which generates a delay signal after a lapse of a predetermined delay time, a release circuit including an electromagnetic means for initiating movement of a mechanical member for driving the camera objective lens assembly in search of the true focus setting thereof, a gating means having an input to which the delay circuit is connected and an output to which the release circuit is connected, a lens arresting means including an electromagnetic means for arresting the objective lens assembly at a definite focal position determined by the distance signal, and another gating means connected between the rangefinder system and the lens arresting means and adapted to receive a delay signal, as a gating signal, from the delay circuit. The two gating means referred to above are adapted to further receive a gating signal when a switch is operated in response to the further depression of the shutter release button.

As is well known to those skilled in the art, it requires a set-up time for the automatic rangefinder system to be brought into stable operation after electric power has been supplied thereto. In view of this, in the present invention, a release system is designed so that the release of the camera objective drive mechanism is enabled after a delay of time sufficient to cover the required set-up time. Because of this arrangement, even if a photographer completely depresses the release button, the various components of the auto-focus camera operate in a predetermined sequence and timing to take a photograhic picture of the target object.

In addition thereto, with an auto-focus camera constructed according to the present invention, the rangefinder system can be brought into operation when the release button is depressed a first predetermined distance without actuating the camera shutter release mechanism and without driving the objective lens assembly in the axial direction of the optical axis of the objective lens assembly. If the finger pressure applied to the shutter release button is subsequently removed without the release button being further depressed, the various components of the auto-focus camera embodying the present invention return to their respective original conditions. This is advantageous in that the photographer can manipulate the auto-focus camera of the present invention as if he is handling a conventional photographic camera having no rangefinder system.

The employment of a latch circuit for storing the distance signal from the rangefinder system is advantageous in that focus-lock photography can be achieved.

In the auto-focus camera according to the present invention, a storing means may store the distance signal from the rangefinder system when the latch circuit is operated independently of the camera shutter release operation, so that focal adjustment of the objective lens assembly can be subsequently effected in accordance with the distance signal stored in the storing means. This is advantageous in that, should the photographer wish to have the image of the target object to be recorded on the photographic film at a location offset from the central portion, i.e. the normal distance measured area, this can be done, after the rangefinder has been brought into operation, simply by actuating the latch circuit while aiming at the desired object with the image of the object being positioned at the central portion of the camera viewfinder field. This distance signal stored in the storing means indicative of the distance from the camera to the desired target object is, after the composition of the picture has been fixed in the manner described above, read out from the storing means to ultimately drive the objective lens assembly to the focal position corresponding to the measured distance from the camera to the target object.

To bring the rangefinder system into operation independently of the shutter release and the focus adjustment of the objective lens assembly, i.e. for the purpose of distance measurement only, the rangefinder system may be brought into operation when the shutter release button is depressed a first predetermined distance without the shutter release mechanism being actuated or the rangefinder system may be brought into operation by manipulation of a manually operable element independent of the movement of the shutter release button.

BRIEF DESCRIPTION OF THE DRAWINGS

These and other objects and features of the present invention will become apparent from the following description taken in conjunction with preferred embodiments thereof with reference to the accompanying drawings, in which.

DETAILED DESCRIPTION OF THE INVENTION

Figure 1:
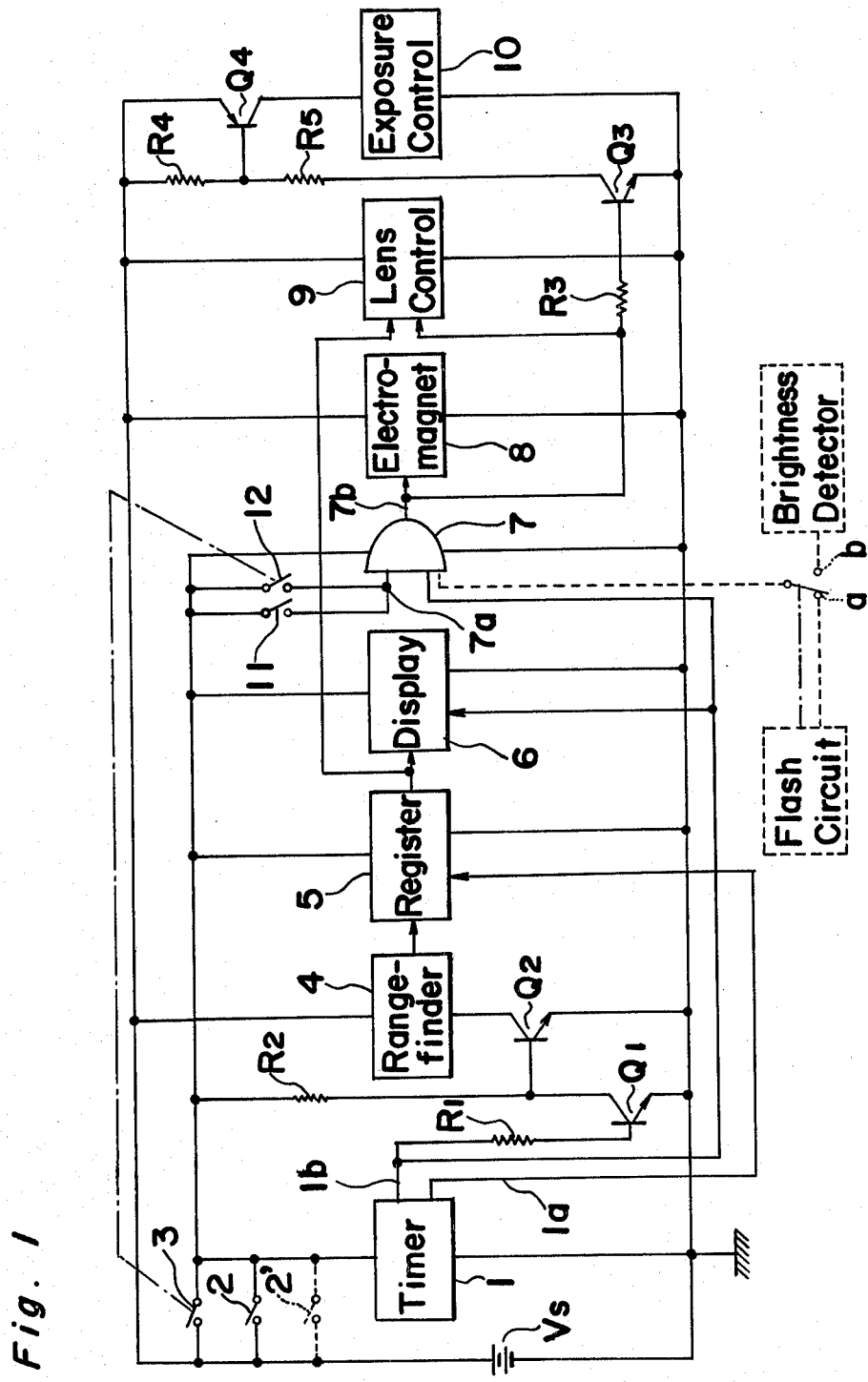
FIG. 1 is a schematic circuit diagram generally showing an automatic focus control system according to one embodiment of the present invention.

Before the description of the present invention proceeds, note that like parts are designated by like reference numerals throughout the accompanying drawings.

Figure 2:
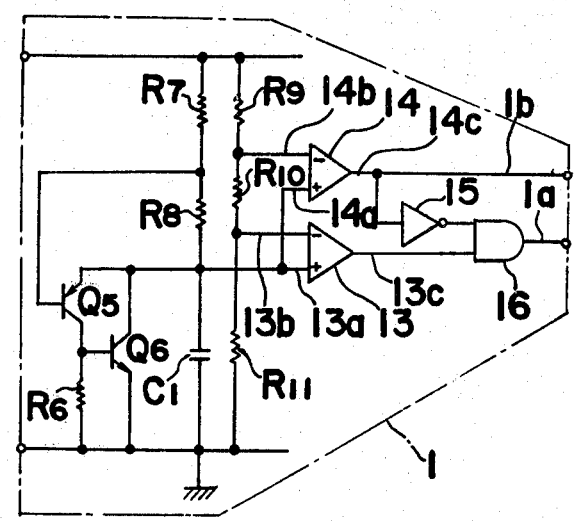
FIG. 2 is a circuit diagram showing the details of the timer circuit shown in FIG. 1.
Figure 8:
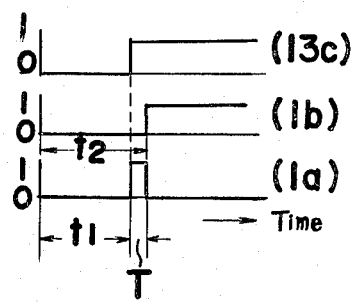
FIG. 8 is a diagram showing waveforms of the outputs from the timer circuit and a signal appearing in the timer circuit.

Referring first to FIG. 1, the automatic focus control system according to the present invention comprises a timer circuit 1 designed so as to generate two output signals having the waveforms shown by 1a and 1b in FIG. 8, respectively, the predetermined times t1 and t2 after either one of the switches 2 or 3 is closed. The details of this timer circuit 1 are shown in FIG. 2.

Figure 4:
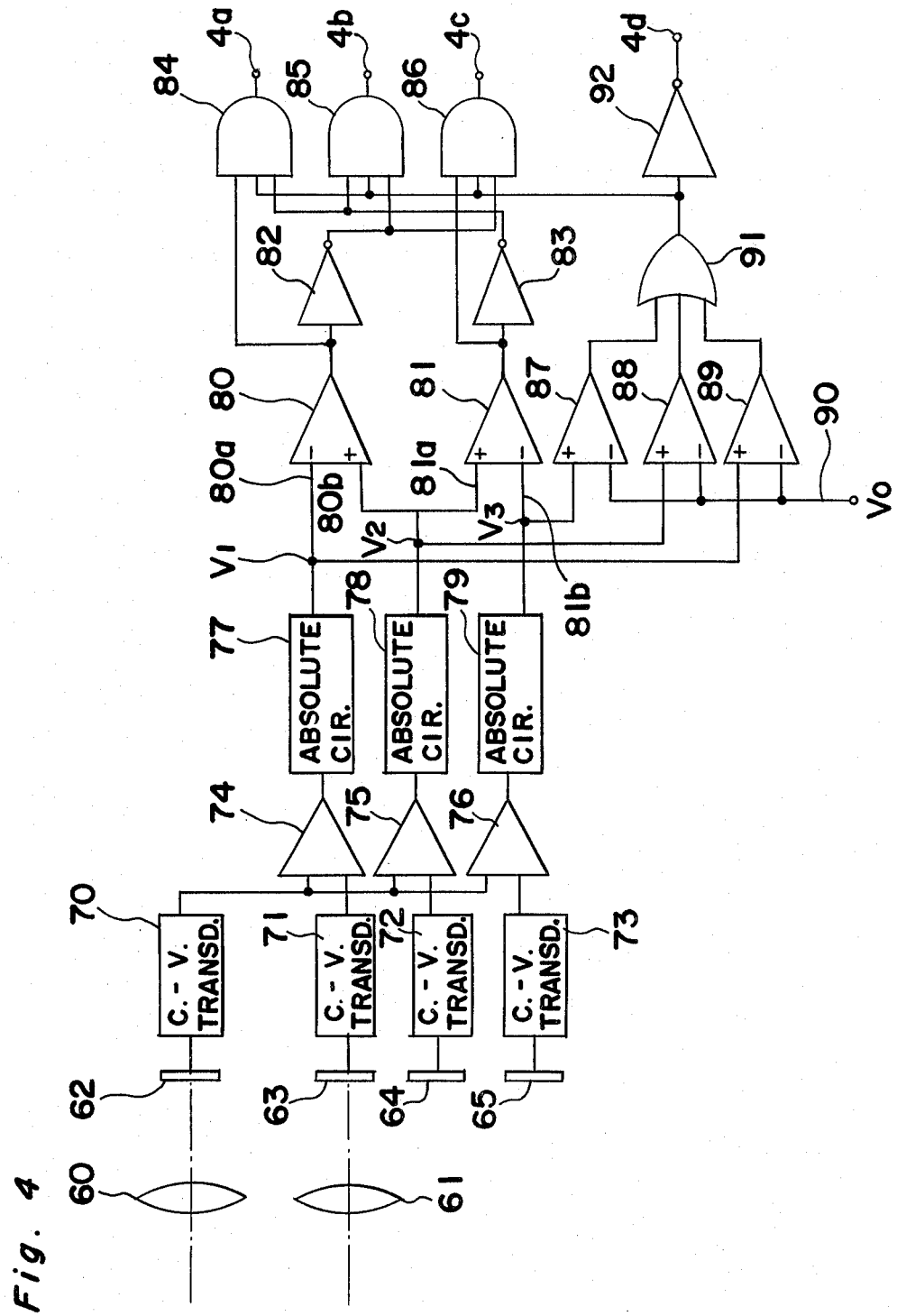
FIG. 4 is a circuit diagram showing the details of the rangefinder system employed in the system of FIG. 1.

A rangefinder circuit 4, the details of which are shown in FIG. 4 and which will be described in detail later, has a plurality of, for example four, output terminals 4a, 4b, 4c and 4d. The rangefinder circuit 4 generates a high level signal at one of the output terminals 4a to 4c depending upon the position of the target object on the line-of-sight path extending from the camera through the target object, that is, depending upon the distance zone in which the target object is located, or at the terminal 4d when a signal is not generated at any one of the terminals 4a to 4c. The outputs of the rangefinder circuit 4 are connected to a register 5 which in turn serves to store the high level signal from one of the output terminals 4a, 4b, 4c and 4d of the rangefinder circuit 4 upon the application of the output signal 1a from the timer circuit 1 to the register 5.

Connected to the register 5 is a display circuit 6 for displaying information indicative of the zone in which the target object is actually located, the information being transmitted to the display circuit 6 as an output signal from the register 5.

The system further comprises an AND gate 7 which generates a high level output signal when a high level output signal 1b from the timer circuit 1 is applied to one input terminal thereof and either one of switches 11 and 12 being closed. The high level output signal from the AND gate 7 is applied in turn to an electromagnet control circuit 8 for operating the latter to release a camera mechanism having a construction which will be described with reference to FIG. 9.

The lens control circuit 9 includes a plurality of electromagnet units each utilized to arrest the objective lens assembly at a particular focal position corresponding to the zone in which the target object is actually located, in accordance with the information from the register 5.

An exposure control circuit 10 is of any known construction and includes an RC time constant circuit, a switching circuit and an electromagnet unit for closing the camera shutter.

Figure 5:
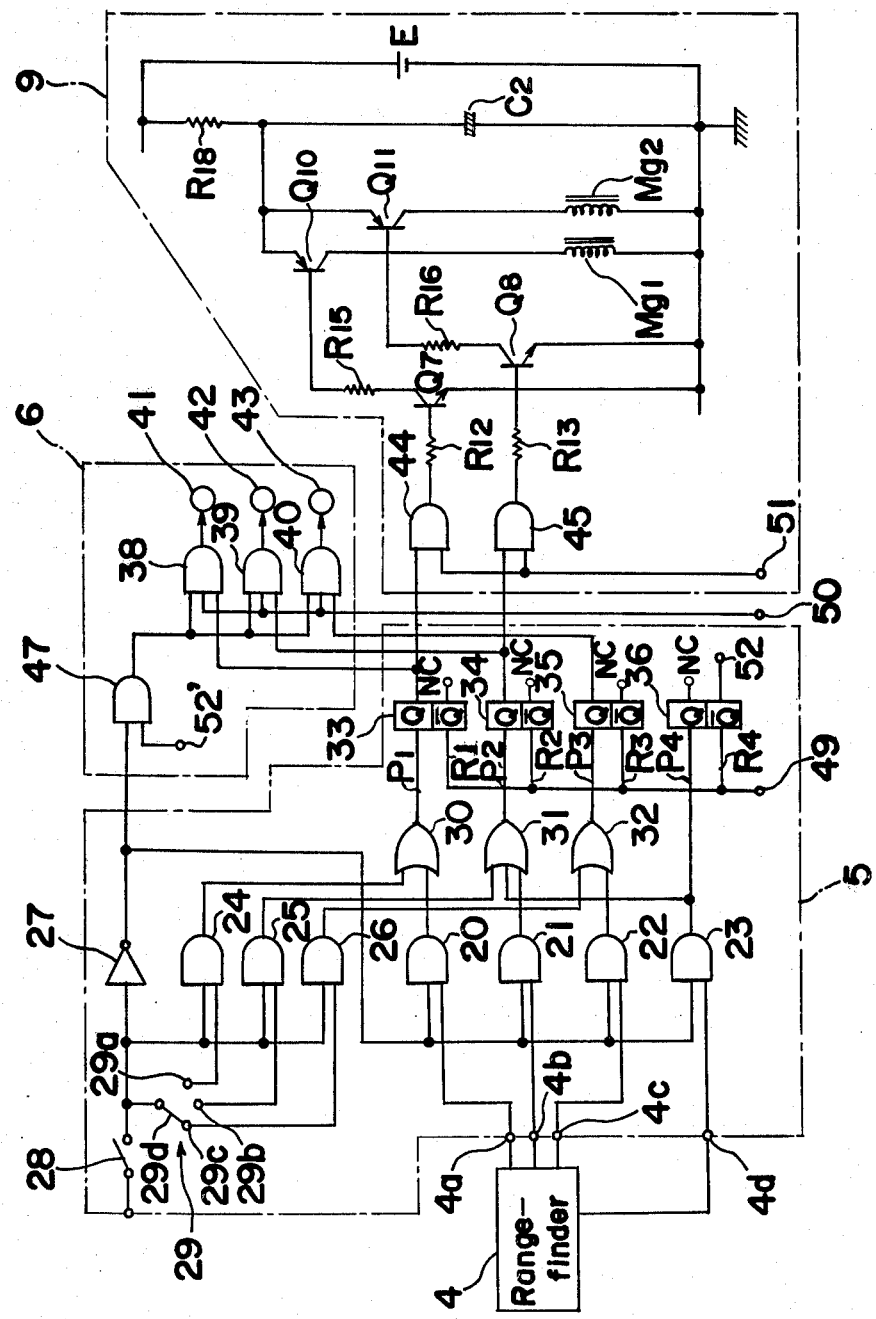
FIG. 5 is a circuit diagram showing the details of the register, the display circuit and the lens control circuit shown in FIG. 1.

Noted that the switches 2 and 11 are operatively associated with a shutter release button in such a manner that, when the shutter release button is depressed by a first stroke, the switch 2 is closed and when the shutter release button is further depressed, the switch 11 is subsequently closed. On the other hand, the switches 3 and 12 are operatively associated with a self-timer, built into the photographic camera in a manner well known to those skilled in the art, so that these switches 3 and 12 are closed by an output signal from the self-timer immediately after a predetermined time set in the self-timer has passed. The details of the register circuit 5, the display circuit 6 and the lens control circuit 9 are shown in FIG. 5.

In the system so far described with reference to FIG. 1, when the switch 2 is closed in response to depression of the shutter release button, electric power is supplied from a power source Vs to the timer circuit 1 to cause the latter to start its counting operation. As shown in FIG. 2, the timer circuit 1 is constituted by a time constant circuit composed of a series circuit of resistors R7 and R8 and capacitor C1, a voltage divider composed of series connected resistors R9, R10 and R11, voltage comparators 13 and 14, an AND gate 16, and a discharge circuit for discharging the electric charge stored in the capacitor C1, the discharge circuit being composed of switching transistors Q5 and Q6 and resistor R6.

When the electric power is supplied to the timer circuit 1 upon closure of the switch 2 in the manner as hereinbefore described, the capacitor C1 is charged by a current flowing through the series connected resistors R7 and R8 and the charging voltage across the capacitor C1 is applied to respective non-inverting inputs 13a and 14a of the comparators 13 and 14, while reference voltages of different levels are applied to the respective inverting inputs 13b and 14b of the comparators 13 and 14. Since the voltage level at the inverting input 13b of the comparator 13 is lower than the voltage level at the inverting input 14b of the comparator 14, as the charging of the capacitor C1 proceeds, the output signal from the comparator 13 is at first inverted from the low level state to the high level state and, subsequently, the output signal of the comparator 14 is inverted from the low level state to the high level state. The time required from the commencement of the supply of electric power to the timer circuit 1 to the inversion of the output signal from the comparator 13 is selected so as to be equal to or longer than the set-up time required for the rangefinder circuit 4 to generate a normal output signal after electric power is supplied thereto. After the lapse of the time period t1, the first output signal 1a, which is referred to as a memory signal, from the timer circuit 1 is applied to the register 5 so that the output signal from the rangefinder circuit 4, which is referred to as a distance signal, can be stored or latched in the register 5.

Subsequently, when the output signal of the comparator 14 is inverted after the time interval t2, the timer circuit 1 generates the second output signal 1b, which is referred to as a voltage signal and which is in turn applied through a resistor R1 to the base of a switching transistor Q1 (see FIG. 1) to cause the latter to conduct. Upon conduction of the transistor Q1, transistor Q2 is switched off to interrupt the supply of electric power to the rangefinder circuit 4. Noted that the supply of the electric power to the rangefinder circuit 4 is effected by way of the transistor Q2 which conducts upon closure of the switch 2.

The second output signal 1b, i.e. the voltage signal, from the timer circuit 1 is also applied to the display circuit 6 and the AND gate 7 so that the display circuit 6 operates to display the information of the zone and the gate 7 is brought into a condition ready to respond to the closure of the switches 11 or 12. Accordingly, when switch 11 or switch 12 is closed prior to the application of the second output signal 1b from the timer circuit 1 to the gate 7, the gate 7 is activated immediately upon receipt of the second output signal 1b from the timer circuit 1 to generate a high level output signal which is in turn applied to the electromagnet circuit 8 to trigger the latter and, on the other hand, is applied to the base of a transistor Q3 causing the latter to conduct. Upon conduction of the transistor Q3, transistor Q4 is conducts whereby the electric power from the power source Vs is supplied to the exposure control circuit 10.

Figure 6:
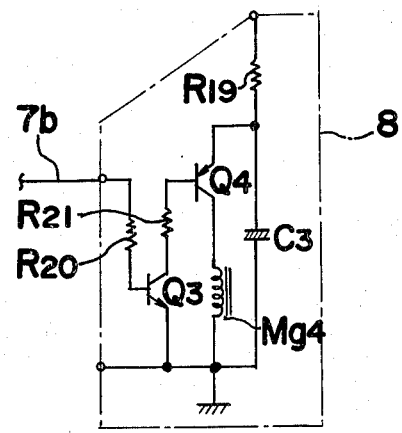
FIG. 6 is a circuit diagram showing the details of the electromagnet control circuit shown in FIG. 1.

When the electromagnet circuit 8 of the construction shown in FIG. 6 is triggered in the manner described above, the camera mechanism is released to drive the objective lens assembly. Simultaneously therewith, the lens control circuit 9 is brought into operation in response to the high level output signal from the gate 7 so that the lens stopper which corresponds to the output signal from the register 5 is actuated to move into the path of the lens driving member to arrest the objective lens assembly at a particular focal position. Subsequently, the camera shutter is released and the exposure control circuit 10 completes the actual picture taking of the target object.

In the circuitry shown in FIG. 1, a checker circuit may be employed for checking the voltage of the power source Vs and for disabling the timer circuit 1 when the voltage of the power source Vs is lower than a predetermined operating voltage. In that case, the checker circuit may be electrically connected in parallel with the timer circuit 1. Moreover, the circuitry of FIG. 1 may include a brightness detector for detecting the brightness of the scene to be photographed and for generating a low level signal when the ambient brightness detected requires such a low shutter speed that a blurred picture is likely to be obtained if the picture is taken with the camera held by hand. This brightness detector may be electrically connected to the gate 7 in the manner as shown by the dashed lines in FIG. 1 so that the gate 7 cannot be enabled to generate the output signal necessary to operate the subsequent stages of the circuitry so long as a low level signal is applied thereto even though high level signals are applied to the gate 7 through the switch 11 or the switch 12 and from the timer circuit 1, respectively.

Instead of or concurrently with the employment of the brightness detector described above, a shutter speed detector for generating a low level signal when the manually selected shutter speed is of a relatively low value may be employed for the same purpose.

Furthermore, the circuitry may include a flash circuit for detecting whether or not an electronic flash unit coupled to the photographic camera is fully charged in readiness for firing and for generating a high level signal in response to completion of the voltage charging in the electronic flash unit, in a manner as shown by the dashed lines in FIG. 1.

Yet, the circuitry of FIG. 1 may further include a manually operable switch 2' connected in parallel with the switches 2 and 3 as shown by the dashed lines in FIG. 1 for the purpose of effecting focal adjustment of the objective lens assembly independently of the operation of the shutter release button which causes the switch 2 to be closed during the first stage of depression thereof as hereinbefore described. The use of this manually operable switch 2' is convenient in the case where it is desired to record the image of the target object, on which the objective lens assembly has been focused, on the photographic film at a position other than the central portion thereof. In this case, the method of taking a photographic picture of the target object would be such that first one aims at the target object with the image of the target object aligned with a central framing mark indicative of distance measured or a focal measurement area within the viewfinder of the camera, then manually closes the switch 2' to effect the focus adjustment of the objective lens assembly and changes the shooting direction of the camera so as to bring the image of the target object out of alignment with the central framing mark so that the image of the target object can ultimately be recorded on a portion of the film offset from the central portion of said film, and finally depresses the shutter release buttom completely.

The use of the manually operable switch 2' involves another advantage in that this manually operable switch 2' can be used for only measuring the distance from the camera to the target object without any intention of taking a photographic picture.

The focus-lock photography referred to above can be performed by the manipulation of the shutter release button in the manner as hereinbefore described. However, because of the employment of the switch 2', the photographer can avoid the possibility that, because the shutter release button is erroneously depressed over its full stroke of movement, the shutter release may occur during the performance of the distance measurement.

The rangefinder circuit 4 referred to above will now be described in detail with particular reference to FIGS. 3 and 4.

Figure 3:
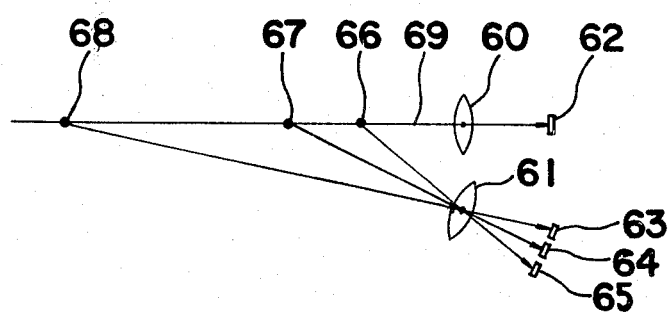
FIG. 3 is a schematic diagram showing the rangefinder optical system employed in the system of FIG. 1.

In FIG. 3, there is schematically shown an photoelectric rangefinder comprising a pair of convergent lens elements 60 and 61 arranged in spaced side-by-side relation to each other, a first light sensor constituted by, for example, one photoelectric element 62 positioned behind the lens element 60 where optical axis substantially coincides with the line-of-sight path of the camera objective, and a second light sensor constituted by a plurality of, for example, three photoelectric elements 63, 64 and 65 positioned behind the lens element 61. Note that the minimum required number of the photoelectric elements constituting the second light sensor should be equal to the number of distance zones assigned to a series of distance ranges from the camera to the target object which are located on the line-of-sight path extending from the camera through the target object within the field of view of the camera. In FIG. 3, the line-of-sight path referred to above is identified by line 69 aligned with the optical axis of the lens element 60 and has zones which are generally referred to as "close-up zone" including the point 66, "medium zone" including the point 67, and "far zone" including the point 68 which may be at infinity, respectively.

The rangefinder shown in FIG. 3 is designed so that the first and second light sensors provide electric signals which are representative of the relative position of the light distribution pattern formed on the photoelectric element 62 with respect to the light distribution pattern formed on the photoelectric elements 63 to 65 depending upon which zone the target object occupies. By way of example, assuming that the target object is located at the point 67 within the medium zone, the intensity of light radiated from the target object and falling on the photoelectric element 62 through the lens element 60 will be equal to that falling on the photoelectric element 64 through the lens element 61 and, therefore, the absolute value of the difference in voltage between the output from the photoelectric element 62 and that from the photoelectric element 64 attains a minimum value, this minimum absolute value being indicative of the zone in which the target object is actually located.

Referring now to FIG. 4, the output terminal of the photoelectric element 62 is connected to a current-voltage transducer 70. The output terminals of the respective photoelectric elements 63, 64 and 65 of the second light sensor are connected to corresponding current-voltage transducers 71, 72 and 73.

A differential amplifier 74 receives input signals from the current-voltage transducer 70 and the first current-voltage transducer 71. Similarly, a differential amplifier 75 receives input signals from the current-voltage transducer 70 and the second current-voltage transducer 72. A further differential amplifier 76 receives input signals from the current-voltage transducer 70 and the third current-voltage transducer 73. In other words, the differential amplifiers 74 to 76 are provided for comparing the output signal from the transducer 70, electrically connected to the photoelectric element 62 of the first light sensor, with the output signals from the transducer 71 to 73 electrically connected to the photoelectric elements 63 to 65 of the second light sensor, respectively.

Output signals from the differential amplifiers 74 to 76 are supplied to absolute value circuits 77, 78 and 79, respectively, for detecting the absolute values of the difference signals produced by the respective differential amplifiers 74 to 76.

An operational amplifier or comparator 80 has an inverting input 80a electrically connected to the absolute value circuit 77, and a non-inverting input 80b electrically connected to the absolute value circuit 78. Similarly, an operational amplifier or comparator 81 has an inverting input 81b, electrically connected to the absolute value circuit 79, and a non-inverting input 81a electrically connected to the absolute value circuit 78. The outputs of the comparators 80 and 81 are respectively connected through associated inverters 82 and 83 to two of the AND gates 84, 85 and 86 and directly to one of the AND gates 84 and 86. Specifically, each of the AND gates 84, 85 and 86 has first, second and third input terminals. The first input terminal of the gate 84 is connected to the junction between the comparator 80 and the inverter 82 and the third input terminal of gate 84 is connected to the NOT element 83 while the second input terminal of gate 84 is electrically connected along with the second input terminal of each of the element 85 and 86 to the junction between OR element 91 and inverter 92. The first input terminal of the gate 85 is connected to the inverter 83 and the third input terminal of gate 85 is connected to the inverter 82. The first terminal of the gate 86 is connected to the junction between the comparator 81 and the inverter 83 and the third input terminal of gate 86 is connected to the inverter 82.

The outputs of the absolute value circuits 77 to 79 are also connected to the non-inverting inputs of operational amplifiers or comparators 87, 88 and 89, respectively. The inverting inputs of the comparators 87 to 89 are electrically connected to a predetermined voltage source Vo through line 90. The outputs of the comparators 87 to 89 are connected to respective inputs of an OR gate 91 which is in turn connected to an inverter 92 and also to the second input terminals of the gates 84 to 86.

In the circuit of the construction described with reference to FIG. 4, assuming that the target object to be photographed is located within the close-up zone, the signal produced from the photoelectric element 65 of the second light sensor will be approximately the same as the signal produced from the photoelectric element 62 of the first light sensor, the latter signal being hereinafter referred to as a reference signal. In view of this, the signal produced from the photoelectric element 64 of the second light sensor will be a little different in amplitude from the reference signal, while the signal produced from the photoelectric element 63 of the second light sensor will be further different from the reference signal. Accordingly, the differential amplifier 76 comparing the signal from the photoelectric element 65 with the reference signal will produce, for example, a small amplitude signal since these two signals are quite similar to each other. In this sense, the differential amplifier 75 comparing the signal from the photoelectric element 64 with the reference signal will produce, for example, a medium amplitude signal while the differential amplifier 74 comparing the signal from the photoelectric element 63 with the reference signal will produce a large amplitude signal. Therefore, the relation between the voltage levels V1, V2 and V3 of the respective outputs from the absolute value circuits 77, 78 and 79 is V1>V2>V3. This relation causes the comparator 80 to produce a low level signal and the comparator 81 to produce a high level signal.

The predetermined voltage Vo supplied through the line 90 has a level somewhat between V2 and V3, provided that the relation of the voltage levels V1, V2 and V3 is V1>V2>V3. The purpose of employing the comparators 87, 88 and 89 is to determine whether or not at least one of the voltage levels V1, V2 and V3 is higher than the predetermined voltage Vo which would be the necessary voltage required for one of the differential amplifiers 74 to 76 to determine whether the signal produced from any one of the photoelectric elements 63 to 65 of the second light sensor is distinctly different in amplitude from the reference signal produced from the photoelectric element 62 of the first light sensor. Since in the case described above, the voltages V1 and V2 are higher than the predetermined voltage Vo, the comparators 88 and 89 are actuated to send high level signals to the OR gate 91 for causing the OR gate to produce a high level signal.

Under the conditions described above, the AND gate 84 receives a low level signal from the comparator 80, a high level signal from the OR gate 91 and a low level signal from the inverter 83. Thus, the output terminal 4a of the AND gate 84 produces a low level signal. Likewise, the AND gate 85 receives a low level signal from the inverter 83, a high level signal from the OR gate 91 and a high level signal from the inverter 82, and therefore, the output terminal 4b of the AND gate 85 produces a low level signal. On the contrary, the AND gate 86 receives a high level signal from the comparator 81, a high level signal from the OR gate 91 and a high level signal from the inverter 82, and therefore the output terminal 4c of the AND gate 86 produces a high level signal indicating that the target object is located within the near distance zone.

On the other hand, if the target object is located within the medium zone, the signal produced from the photoelectric element 64 of the second light sensor is approximately the same as the reference signal, that is, the signal produced from the photoelectric element 62 of the first light sensor, while the signals produced respectively from the photoelectric elements 63 and 65 of the second light sensor are different in amplitude from the reference signal. Accordingly, the relation between the voltages V1, V2 and V3 of the outputs from the absolute value circuits 77 to 79, respectively, is V2<V1 and V2<V3. This relation causes both of the comparators 80 and 81 to produce a low level signal. Assuming the voltage levels of the voltages V1 and V3 are higher than the predetermined voltage V0, the comparators 87 and 89 produce high level signals to the OR gate 91, which in turn produces a high level signal.

Under the conditions described above, the AND gate 84 receives a low level signal from the comparator 80, a high level signal from the OR gate 91 and a high level signal from the inverter 83. Therefore, the output terminal 4a of the AND gate 84 produces a low level signal. The AND gate 85, on the other hand, receives a high level signal from the inverter 83, a high level signal from the OR gate 9 and a high level signal from the inverter 82, and therefore the output terminal 4b of the AND gate 85 produces a high level signal. Yet, the AND gate 86 receives a low level signal from the comparator 82, a high level signal from the OR gate 91 and a high level signal from the inverter 82, and therefore at the output terminal 4c of the AND gate 86 produces a low level signal. Accordingly, the high level signal from the output terminal 4b of the AND gate 85 indicates that the target object is located within the medium zone.

Similarly, if the target object is located within the far zone, the signal produced from the photoelectric element 63 of the second light sensor will be approximately the same as the reference signal, that is, the signal from the photoelectric element 62 of the first light sensor, while the signal produced from the photoelectric element 64 of the second light sensor will be a little different in amplitude from the reference signal and the signal produced from the photoelectric element 65 of the second light sensor will be further different from the reference signal. Accordingly, the relation between the voltage levels V1, V2 and V3 of the outputs from the value circuits 77 to 79, respectively, is V1<V2<V3. This relation causes the comparator 80 to produce a high level signal and the comparator 81 to produce a low level signal. Assuming that the voltage levels of the voltages V2 and V3 are higher than the predetermined voltage Vo, the comparators 87 and 88 produce high level signals to the OR gate 91, which in turn produces a high level signal.

Under the conditions described above, the AND gate 84 receives a high level signal from the comparator 80, a high level signal from the OR gate 91 and a high level signal from the inverter 83.

Therefore, the output terminal 4c of the AND gate 84 produces a high level signal. Whereas the AND gate 85 receives a high level signal from the inverter 83, a high level signal from the OR gate 92 and a low level signal from the inverter 82 thereby producing a low level signal at the output terminal 4b thereof, while AND gate 86 receives a low level signal from the comparator 81, a high level signal from the OR gate 92 and a low level signal from inverter 82 thereby producing a low level signal at the output terminal 4c thereof. Accordingly, the signal at the output terminal 4c thereof. Accordingly, the high level signal from the output terminal 4a of the AND gate 84 indicates that the target object is located within the far zone.

In any event, however, if the target object is very dark to such an extent as to produce very weak radiation therefrom or when the target object has contrast such and as in a white plain wall so as to produce a uniform radiation therefrom, the signal produced from any one of the photoelectric elements 63 to 65 of the second light sensor will be approximately the same as the reference signal. Therefore, the signals produced from the differential amplifiers 74 to 76 will be low level signals. Accordingly, the relation between the voltage levels V1, V2 and V3 of the outputs from the absolute value circuits 77 to 79, respectively is V1≈V2≈V3<V0. This relation causes all the comparators 87 to 89 to produce low level signals which is transmitted to the OR gate 91 which in turn produces the low level signal. Accordingly, all the AND gates 84 to 86 produce a low level signal. However, even though all of the AND gates 84, 85 and 86 generate low level signals, which means that the system is unable to effect the distance measurement, the low level signal produced by the OR gate 91 is inverted by the inverter 92 into a high level signal. The high level signal produced by the output terminal 4d of the inverter 92 may be utilized, in a manner as will be described later, to warn the photographer that the distance measurement is impossible.

Note that the present invention is not intended to be limited to the three zone system as shown, but may be applied to a two, four or more zone system. In this case, a number of photoelectric elements corresponding to the number of zones is required for the second light sensor. Further, the first light sensor may employ a plurality of photoelectric elements in combination with an increased number of photoelectric elements for the second light sensor.

The details of each of the register 5, the display circuit 6 and the lens control circuit 9 will now be described with particular reference to FIG. 5.

Referring to FIG. 5, the four output terminals 4a to 4d of the rangefinder circuit 4 having the construction shown in and described with reference to FIG. 4 are respectively connected to the second input terminals of AND gates 20, 21, 22 and 23 each having a first input connected to a an inverter 27.

The register 5 also includes three AND gates 24, 25 and 26, each having a first input connected to the input of the inverter 27, and a second input connected to a manipulatable switch 29 as will be described later. The register 5 further includes three OR gates 30, 31 and 32, and flip-flop circuits 33, 34, 35 and 36.

The OR gate 30 has first input terminal connected to the AND gate 24 and a second input terminal connected to AND gate 20. The OR element 31 has a first input terminal connected to the AND gate 25, a second input terminal connected to the AND gate 23 and a third input terminal connected to the AND gate 21. The OR gate 32 has a first input terminal connected to the AND gate 26 and a second input terminal connected to AND gate 22. Respective outputs of the OR gates 30 to 32 are connected to corresponding preset terminals P1, P2 and P3 of the flip-flop circuit 33 to 35 while the output of the AND gate 23 is connected to a preset terminal P4 of the flip-flop circuit 36.

Figure 7:
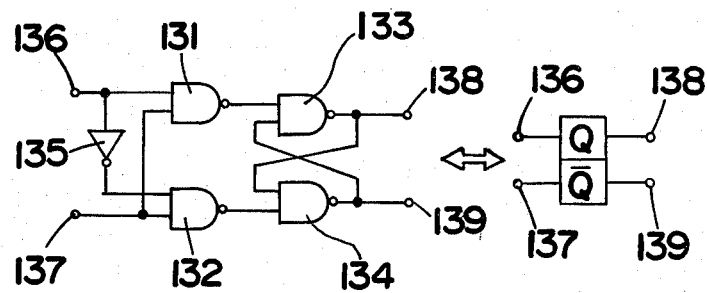
FIG. 7 is a circuit diagram showing the details of each flip-flop circuit in the circuit of FIG. 5.

Each of these flip-flop circuits 33 to 36 may be constructed in a manner as shown in FIG. 7 and utilizes four NAND gates 131, 132, 133 and 134 and one inverter 135.

The manipulatable switch 29 has three fixed contacts 29a, 29b and 29c respectively connected to the third inputs of the associated AND gates 24, 25 and 26 and a movable contact 29d selectively engageable with any one of the fixed contacts 29a to 29c and connected to a junction between the manually operable switch 28 and the input of the inverter 27.

The display circuit 6 includes AND gates 38, 39 and 40 each having a first input connected to the output of an AND gate 47, a second input connected to a connection terminal 50 to which the second output signal 1b from the timer circuit 1 is applied, and a third input connected to the Q output of a corresponding flip-flop circuit 33, 34 or 35. The AND gate 47 has a first input connected to the inverter 27 and a second input connected to a connection terminal 52'. The AND gate 38, 39 and 40 have their respective outputs connected to associated display elements 41, 42 and 43 which may be composed of light emitting diodes.

The electromagnet circuit 9 includes two AND gates 44 and 45 each having a first input connected to the Q output of a corresponding flip-flop circuit 33 or 34 and a second input connected to a connection terminal 51 which is in turn connected to the output line 7b leading from the output of the AND gate 7 shown in FIG. 1.

The output of AND gate 44 is connected through resistor R12 to the base of transistor Q7. The output of AND gate 45 is connected through resistor R13 to the base of transistor Q8. The collector of transistor Q7 is connected to the base of transistor Q10 through resistor R15. The collector of transistor Q8 is connected to the base of transistor Q11 through resistor R16. The emitters of transistors Q7 and Q8 are connected to ground. Transistors Q10 and Q11 have their emitters connected to the junction between resistor R18 and capacitor C2. The collector of transistor Q10 is connected to ground through electromagnetic coil Mg1. The collector of transistor Q11 is connected to ground through electromagnetic coil Mg2.

The auto-focus camera embodying the present invention further comprises a lens drive mechanism, the details of which will now be described with particular reference to FIG. 9.

Figure 9:
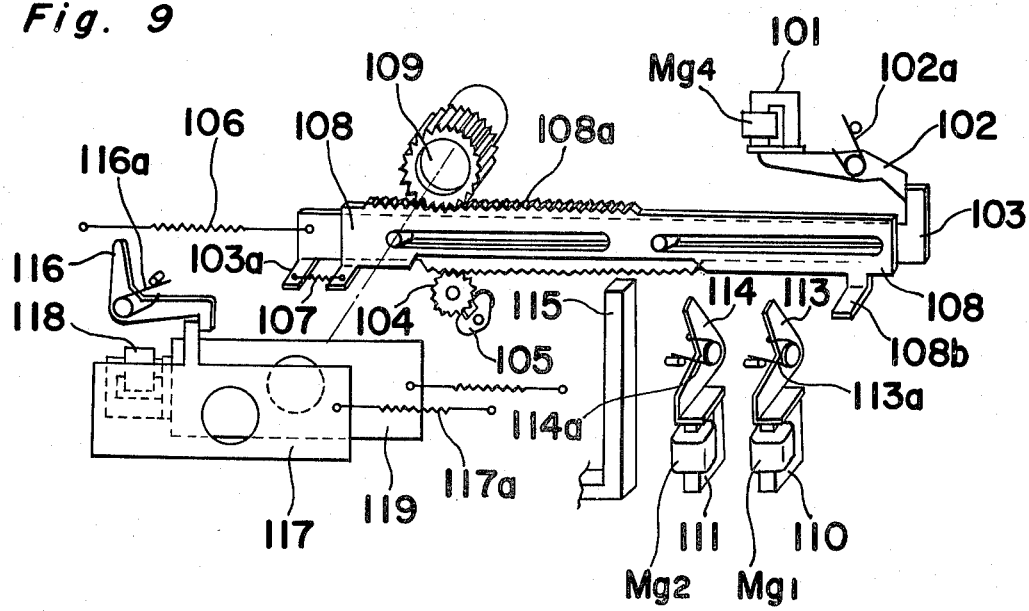
FIG. 9 is a diagram showing a lens drive mechanism to be coupled with the system of FIG. 1.

Referring to FIG. 9, an electromagnetic unit 101, having a permanent magnet and an electromagnetic coil Mg4 included within the electromagnet circuit 8 (FIG. 1) and electrically connected in a manner as shown in FIG. 6, serves to allow a retainer lever 102 to be pivoted counterclockwise by the action of a wire spring 102a, when the electromagnetic coil Mg4 is energized to counterbalance the force of the permanent magnet, so that a leading slider 103 which has been retained at a first position by the retainer lever 102 as shown in FIG. 9, is released to move towards a second position by the action of a spring element 106. Note that, during the movement of the leading slider 103 from the first position towards the second position, a braking force is applied to the leading slider 103 from a slow governor composed of a latchet gear 104 and an anchor member 105.

The movement of the leading slider 103 effected in the manner described above is accompanied by a corresponding movement of a rack member 108 coupled to the leading slider 103 by means of a spring element 107. The movement of the rack member 108 is transmitted to the objective lens assembly 109 through teeth 108a. Disposed on the path of movement of an engagement projection 108b laterally protruding from the rack member 108 are stoppers 113, 114 and 115 which are arranged at respective positions corresponding to the focal positions of the objective lens assembly 109, namely, the near zone setting, the medium zone setting and the far zone setting. The stopper 115 is fixed at one end of the range of movement of the rack member 108 so that, when the rangefinder system indicates that the target object is located within the far zone including the point 68 shown in FIG. 3 in the manner as hereinbefore described, the engagement projection 108b engages the stopper 105 with the objective lens assembly 109 consequently brought to the far zone setting. On the other hand, each of the stoppers 113 and 114 is supported for pivotal movement between engaged and disengaged positions, but is normally held at the disengaged position by the magnetic force exerted by a corresponding permanent magnet core constituting an electromagnetic unit 110 or 111 together with the associated magnetic coil Mg1 or Mg2. When the electromagnetic coil Mg1 or Mg2 is energized in a manner as will be described later to exert a magnetic force sufficient to counteract with the magnetic force exerted by the permanent magnet core around which the electromagnetic coil Mg1 or Mg2 is wound, the associated stopper 113 or 114 will pivot to the engaged position by the action of an associated biasing spring 113a or 114a so that the engagement projection 108b of the rack member 108 engages the stopper 113 or 114 during the subsequent movement of the rack member to position the objective lens assembly 109 to the near or medium zone setting.

After the focus adjustment of the objective lens assembly 109 has been effected by the engagement projection 108b engaging one of the stoppers 113, 114 or 115, the leading slider 103 continues to move towards the second position as pulled by the spring element 106. When the leading slider 103 completes its movement to the second position, a release projection 103a integral with the slider 103 engages a release lever 116 to cause the latter to pivot counterclockwise against a biasing spring 116a. Consequently, the shutter opening member 117 is moved from a closed position, as shown, towards an opened position by the action of a biasing spring 117a to effect an photographic exposure of the film. Note that the resetting of the leading slider 103 and that of the shutter opening and closing members 117 and 119 can be effected in a known manner in operative association with a film winding operation.

The auto-focus camera embodying the present invention operates in the following manner.

Assuming that the switch 2 shown in FIG. 1 is closed in response to the first stage of depression of the shutter release button, the rangefinder circuit 4 is supplied with electric power and, after the lapse of the predetermined set-up time, generates an effective output signal.

Assuming that the rangefinder circuit 4 generates a high level signal through the output terminal 4b, the high level output signal appearing at the output terminal 4b of the rangefinder circuit 4 is supplied to the OR gate 31 (see FIG. 5). Therefore, the OR gate 31 generates a high level signal which is applied to the associated flip-flop circuit 34 whereby the latter assumes a high level state. Subsequently, when the high level output signal 1b from the timer circuit 1 is supplied to the AND gates 38, 39 and 40 through the connection terminal 50, only the AND gate 39 is enabled to energize the display element 42.

As the shutter release button is further depressed a second predetermined distance, the switch 11 is closed and a high level signal is applied from the AND gate 7, shown in FIG. 1, to the connection terminal 51, shown in FIG. 5, whereby the AND gate 45 is enabled to generate a high level signal. This high level signal from the AND gate 45 is then applied to the base of the transistor Q8 to cause the latter to conduct. Conduction of the transistor Q8 results in conduction of the transistor Q11 and, therefore, the electric charge stored in the capacitor C2 is supplied to the electromagnetic coil Mg2 through the resistor R18 to energize the coil.

Upon energization of the electromagnetic coil Mg2, the magnetic force of the permanent magnet core 111 is counteracted by the magnetic force exerted by the energized electromagnetic coil Mg2 and, therefore, the stopper 114 is pivoted to the engaged position by the action of the spring element 114a so that the subsequent movement of the rack member 108 can be interrupted at a position corresponding to the medium zone setting of the objective lens assembly 109.

Note that the series circuit of resistor R18 and capacitor C2 is electrically connected to power source E independently of the power switch 2. Note also that, since the electromagnetic coils Mg1 and Mg2 concurrently utilize the capacitor C2, the current consumed by the electromagnetic coils Mg1 and Mg2 will not increase.

When the switch 28 is subsequently manually closed, the AND gates 21 to 23 and 36 to 38 are all disabled and, as a result thereof, the output signal from the rangefinder circuit 4 is neither utilized nor displayed. However, since the AND gates 24 to 26 are enabled, one of the flip-flop circuits which correspond to one of the fixed contacts 29a, 29b and 29c to which the movable contact 29d is manually engaged is preset by the first output signal 1a from the timer circuit appearing on terminal 49. Therefore, by manipulating the switch 29, more specifically, selectively engaging the movable contact 29d to one of the fixed contacts 29a to 29c as desired, the focal adjustment of the objective lens assembly 109 can be achieved independent of the output signal from the rangefinder circuit 4. Even in this case, the operation of the lens control circuit 9 and the lens drive mechanism shown in FIG. 9 which takes place after the flip-flop circuit has been preset in the manner described above is similar to that described hereinbefore. It is also clear that a similar operation takes place even if the switches 3 and 12 are closed in response to the expiration of the preset time of the self-timer built into the photographic camera.

In the case where the high level output signal indicative of the failure of the rangefinder to measure the distance from the camera to the target object is generated from the output terminal 4d of the rangefinder circuit 4, the flip-flop circuits 34 and 36 are preset by the output signal 1a from the timer circuit 1, provided that the switch 28 is opened. In this case, when the flip-flop circuit 36 is preset, the Q output from this flip-flop circuit 36 assumes a low level state and, therefore, the AND gate 47 is disabled. Under these conditions, none of the display elements 41 to 43 is energized. However, when the shutter release is effected during this condition, the objective lens assembly 109 is adjusted to the medium zone setting on the basis of the preset output from the flip-flop circuit 34. In other words, the system is so designed that, when the rangefinder is unable to determine the distance from the camera to the target object and, therefore, a high level output signal is generated from the output terminal 4d of the rangefinder circuit 4, the objective lens assembly 109 is moved to a predetermined focal position which may be a panfocal position or a zone setting including the panfocal position.

If the Q output of the flip-flop circuit 36 is connected to the AND gate 7 through the connection terminal 52 in a known manner, the shutter will not be released, even if the shutter release button is completely depressed, when and so long as the high level output signal appears at the output terminal 4d of the rangefinder circuit 4. Yet, an arrangement may be made such that, when the rangefinder system is switched into an manual focus adjustment mode, the shutter release capability can be enabled.

Figure 10:
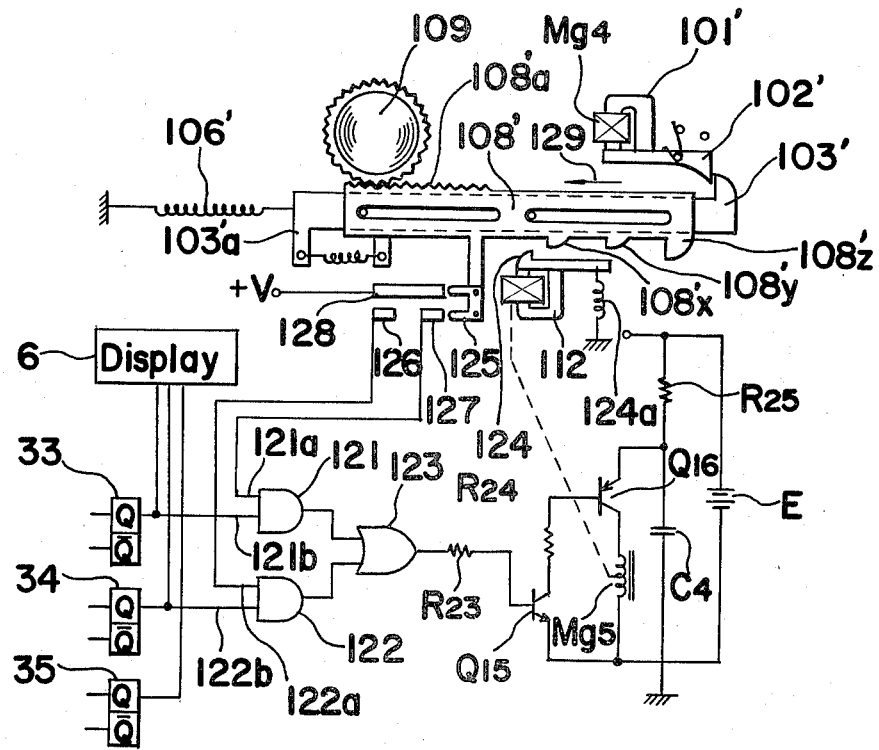
FIG. 10 is a diagram similar to FIG. 9, showing a modified form of the lens drive mechanism.

FIG. 10 illustrates another embodiment of the present invention in which the lens drive mechanism is modified. In this embodiment shown in FIG. 10, the Q outputs of the associated flip-flop circuits 34 and 35 are connected to respective inputs 121b and 122b of AND gates 121 and 122. The outputs of these AND gates 121 and 122 are connected to the base of transistor Q15 through an OR gate 123 by way of a resistor R23. The other inputs 121a of the AND gate 121 and 122a of the AND gate 122 are respectively connected to fixed contact pieces 127 and 126 spaced a predetermined distance from each other. The circuit composed of the transistor Q15 and Q16, resistors R24 and R25, capacitor C4 and electromagnetic coil Mg5 is similar to the circuit shown in FIG. 6 and, therefore, by allowing the potential stored in the capacitor C4 to be discharged upon conduction of the transistor Q16 which results from conduction of the transistor Q15, the electromagnetic coil Mg5 is energized to develop a magnetic force counteracting the magnetic force of the permanent magnet core 112 so that ratchet member 124 normally attracted by the permanent magnet core 112 and held in a disengaged position pivots towards an engaged position by the action of spring element 124a.

The rack member shown by 108' has engagement projections 108x, 108y and 108z equal in number to the number of distance zones on the line-of-sight path 69 (FIG. 3) which are selectively engageable with the ratchet member 124 when the latter is held in the engaged position with the electromagnetic coil Mg5 energized. The rack member 108' carries an electric bridge member 125 movable together with the rack member 108' which electrically connects an elongated contact member 128, coupled to power source +V, to one of the contact pieces 127 and 126 during the movement of the rack member 108'. Note that the contact pieces 126, 127 and 128 and the bridge member 125 constitute a position detector for detecting the position of the rack member 108' and, hence, the objective lens assembly, and for generating an electric signal in the form of a high level signal which is indicative of the position of the rack member 108', and therefore, the objective lens assembly 109.

The lens drive mechanism shown in FIG. 10 is constructed so that, when the elongated contact member 128 is electrically connected to, for example, the contact piece 127 through the bridge member 125 during the movement of the rack member 108' which has been effected in the manner hereinbefore described with reference to FIG. 9, a high level signal is fed to the first input of the AND gate 121. Therefore, when a high level signal is fed to the second input 121b from the flip-flop circuit 33, AND gate 121 is enabled to generate a high level signal. Similarly, when the bridge member 125 is brought to a position where the elongated contact member 128 is electrically connected to the contact piece 126, a high level signal is fed to the first input 122a of the AND gate 122 therefore, when a high level signal is fed to the second input 122b of the AND gate 122 from the flip-flop circuit 34, AND gate 122 is enabled to generate a high level signal.

The high level signal emerging from the OR gate 123 is applied through the resistor R23 to the base of the transistor Q15 to place the latter in a conductive state, which subsequently results in conduction of the transistor Q16. Upon conduction of the transistor Q16, the electromagnetic coil Mg5 is energized to cause the ratchet member 124 to be positioned at the engaged position by the action of the spring element 124a. Therefore, it is clear that, depending upon whether AND gate 121 or 122 is enabled, one of the engagement projections 108x and 108y is engated with the ratchet member 124 in the engaged position to arrest the objective lens assembly 109, which is displaced together with the movement of the rack member 108', at a definite focal setting. However, when a low level signal is generated by both of the flip-flop circuits 33 and 34 and, therefore, a low level signal is generated by the OR gate 123, the electromagnetic coil Mg5 is not energized and the ratchet member 124 is held in the disengaged position while the rack member 108' moves further until the engagement projection 108z is engaged with the ratchet member 124 in the disengaged position.

Although the present invention has fully been described in connection with the preferred embodiments thereof with reference to the accompanying drawings, note that various changes and modifications are apparent to those skilled in the art. Such changes and modifications are to be understood as included within the true scope of the present invention unless they depart therefrom.

What is claimed is:

1. An automatic focus control system for a camera with an objective lens assembly, said system comprising:

a rangefinder means for generating a zone signal indicative of the distance zone from among a plurality of contiguous distance zones extending along the line of sight path of the objective lens assembly whereat a target object to be photographed is located;

an electric power source;

a manually actuable power switch connected to said electric power source;

a delay means connected to said power switch for generating an output signal a predetermined time after actuation of said power switch, said predetermined time sufficient to enable said rangefinder means to achieve stable operation;

a gating means connected to said rangefinder means and said delay means for passing said zone signal therethrough in response to said output signal of said delay means;

a lens drive mechanism for unidirectional displacement of the objective lens means from a first extreme position toward a second extreme position when released;

a release means, connected to said delay means and said lens drive mechanism, having an electromagnetic unit for releasing said lens drive mechanism in response to said output signal of said delay means; and a lens arresting means connected to said gating means and said lens drive mechanism for arresting said displacement of the objective lens means at a position corresponding to said distance zone indicated by said zone signal passed by said gating means.

2. An automatic focus control system as claimed in claim 1, further comprising a storing means connected to said rangefinder means and said delay means for storing said zone signal in response to said output signal of said delay means.

3. An automatic focus control system as claimed in claim 1 wherein said lens arresting means includes a plurality of electromagnetic units and each of said electromagnetic units of said release means and said lens arresting means includes a permanent magnet and an electromagnetic coil wound on said permanent magnet.

4. An automatic focus control system as claimed in claim 1, wherein:
   said system further comprises a manual shutter release member, said power switch being connected to said shutter release member for actuation by the initial depression of said shutter release member; and
   said lens drive mechanism further comprises means to release the shutter after said lens arresting means arrests said displacement of the objective lens means.

5. An automatic focus control system as claimed in claim 4, wherein:
   said shutter release member further comprises a switch actuated upon further depression of said shutter release member; and
   said gating means is further connected to said shutter release member for receiving an input signal from said switch of said shutter release member.

6. An automatic focus control system as claimed in claim 1, wherein:
   said lens drive mechanism comprises first and second movable members for unidirectional displacement when released, said first movable member displacable for unidirectional displacement of the objective lens means and arrestable by said lens arresting means and said second movable member displaceable in conjunction with said displacement of said first movable member for releasing a shutter opening member upon reaching the limit of said displacement.

7. An automatic focus control system as claimed in claim 1, wherein:
   said rangefinder means includes means for generating an output signal indicative of the failure of said rangefinder means to determine the distance zone whereat the target object is located; and
   said lens arresting means is connected to said rangefinder means for arresting said displacement of the objective lens means at a predetermined position in response to said output signal indicative of the failure of said rangefinder means.

8. An automatic focus control system as claimed in claim 1, wherein:
   said lens arresting means includes a plurality of electromagnetic units and a common capacitor, each of said electromagnetic units including a permanent magnet and an electromagnetic coil wound on said permanent maget, said electromagnetic coils of said electromagnetic units being supplied with an electric current one at a time from said common capacitor.

9. An automatic focus control system as claimed in claim 1, further comprising:
   storing means connected to said rangefinder means for storing said zone signal; and
   a manually operable member connected to said storing means for initiating said storage of said zone signal in said storing means, said manually operable member being manipulatable without releasing said lens drive mechanism.

10. An automatic focus control system as claimed in claim 9, wherein said system further comprises:
    a manual shutter release member connected to said release means and said manually operable member for operating said manually operable member by the initial depression of said shutter release member and for causing the release of said lens drive mechanism upon further depression of said shutter release member.

11. An automatic focus control system as claimed in claim 10, wherein:
    said storing means includes a latching circuit for latching said zone signal; and
    said manually operable member includes a switch for applying a latching signal to said latching circuit.

12. An automatic focus control system as claimed in claim 9, wherein:
    said system further comprises a manual shutter release member, said power switch being connected to said shutter release member for actuation by the initial depression of said shutter release member; and
    said manually operable member is operable independent of the depression of said shutter release member.

13. An automatic focus control system as claimed in claim 12, wherein:
    said storing means includes a latching circuit for latching said zone signal; and
    said manually operable member includes a switch for applying a latching signal to said latching ciruit.

14. An automatic focus control system as claimed in claim 9, wherein:
    said storing means includes a latching circuit for latching said zone signal; and
    said manually operable member includes a switch for applying a latching signal to said latching circuit.

* * * * *